US008326285B2

(12) United States Patent
Klassen (10) Patent No.: US 8,326,285 B2
(45) Date of Patent: Dec. 4, 2012

(54) METHOD OF MANAGING INBOUND COMMUNICATIONS BASED ON THE CURRENT LOCATION OF A WIRELESS COMMUNICATIONS DEVICE

(75) Inventor: Gerhard Dietrich Klassen, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 813 days.

(21) Appl. No.: 12/014,839

(22) Filed: Jan. 16, 2008

(65) Prior Publication Data
US 2009/0181651 A1    Jul. 16, 2009

(51) Int. Cl.
H04W 4/00    (2009.01)
(52) U.S. Cl. ............... 455/432.1; 455/456.1; 455/466
(58) Field of Classification Search .................. None
See application file for complete search history.

(56) References Cited

U.S. PATENT DOCUMENTS

| | | | | |
|---|---|---|---|---|
| 5,815,808 | A | * | 9/1998 | Valentine ............... 455/422.1 |
| 6,052,709 | A | * | 4/2000 | Paul ............................ 709/202 |
| 7,221,939 | B2 | * | 5/2007 | Ylitalo et al. ........... 455/435.1 |
| 2003/0064707 | A1 | * | 4/2003 | Yoneyama ................ 455/412 |
| 2005/0169274 | A1 | | 8/2005 | Shuster |
| 2009/0124243 | A1 | * | 5/2009 | Routley et al. ........... 455/418 |

FOREIGN PATENT DOCUMENTS

| | | |
|---|---|---|
| EP | 1 280 081 A1 | 1/2003 |
| FR | 2 879 965 A1 | 8/2007 |

OTHER PUBLICATIONS

European Search Report for EP Application No. 08150312.0 mailed Jul. 1, 2008.

* cited by examiner

Primary Examiner — Erika A Washington
(74) Attorney, Agent, or Firm — Gowling Lafleur Henderson LLP (57) ABSTRACT

A method of managing inbound communications received by a roaming wireless communications device entails enabling a user of the roaming wireless communications device to activate an inbound communications filter having filter criteria based on a current location of the user and a current location of a sender of an inbound communication. Once the wireless device has determined whether the inbound communication satisfies the filter criteria, the wireless device notifies the user that the inbound communication has been received provided that the inbound communication satisfies the filter criteria.

28 Claims, 8 Drawing Sheets

METHOD OF MANAGING INBOUND COMMUNICATIONS BASED ON THE CURRENT LOCATION OF A WIRELESS COMMUNICATIONS DEVICE

CROSS-REFERENCE TO RELATED APPLICATIONS

This is the first application filed for the present invention.

TECHNICAL FIELD

The present disclosure relates generally to wireless communications devices and, in particular, to techniques for managing inbound communications based on the current location of the wireless device.

BACKGROUND

Wireless communications devices having voice, e-mail and Web-browsing capabilities are rapidly increasing in popularity both for personal and business use. However, when a wireless user travels or "roams" to another city, the user may wish to be notified of any inbound communications that originate from within the city in which the user is currently roaming. Presently, wireless communications device do not distinguish inbound communications that originate locally to the roaming device from those that originate from other (remote) locations. A wireless device that overcame this deficiency would thus be highly desirable.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

The present technology provides, in general, a method of managing inbound communications received by a roaming wireless communications device that enables the user to filter the inbound communications so as to exclusively display, prioritize, highlight or give precedence to those communications (e.g. e-mails, SMS, MMS or PIN text messages, or phone calls) that originate from senders who themselves are located within the geographical area in which the user is currently roaming. Alternatively, the device can be configured to only display those inbound communications that originate from the geographical area (e.g. city) in which the user is roaming to the exclusion of all other communications. Accordingly, the user can enable this roaming profile to ensure that he or she is readily apprised of all inbound communications from contacts or other people in the city or area in which he or she is currently located. This new technology is very helpful when the roaming user wishes to focus his attention on any communications emanating from the area in which he is currently roaming, such as, for example, when awaiting or expecting instructions or directions from local contacts, or simply to prioritize messages or calls from business or personal contacts with whom the user is traveling to visit or meet.

Accordingly, an aspect of the present technology is a method of managing inbound communications received by a roaming wireless communications device that include steps of enabling a user of the roaming wireless communications device to activate an inbound communications filter having filter criteria based on a current location of the user and a current location of a sender of an inbound communication, determining whether the inbound communication satisfies the filter criteria, and notifying the user that the inbound communication has been received provided that the inbound communication satisfies the filter criteria.

Another aspect of the present technology is a computer program product that includes code adapted to perform the steps of the foregoing method when the computer program product is loaded into memory and executed on a processor of a wireless communications device.

Yet another aspect of the present technology is a wireless communications device having an input device for enabling a user of the wireless communications device to activate an inbound communications filter having filter criteria based on a current location of the user and a current location of a sender of an inbound communication, a processor coupled to memory for determining whether the inbound communication satisfies the filter criteria, and a user output interface for notifying the user that the inbound communication has been received provided that the inbound communication satisfies the filter criteria.

The details and particulars of these aspects of the technology will now be described below, by way of example, with reference to the attached drawings.

Figure 1:
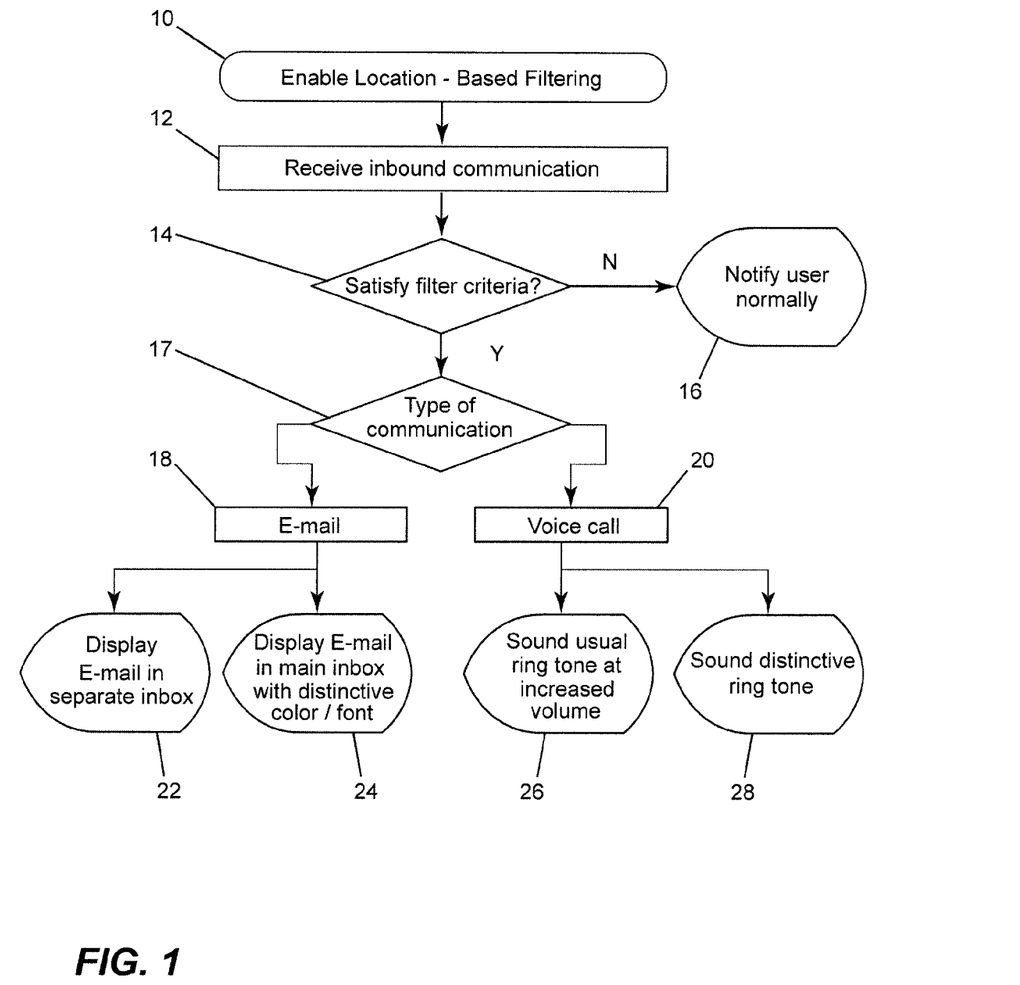
FIG. 1 is a flowchart outlining steps of a method of managing inbound communications on a roaming wireless communications device in accordance with the present technology.

FIG. 1 is a flowchart outlining steps of a method of managing inbound communications received by a roaming wireless communications device. This method includes an initial step (step 10) of enabling a user of the roaming wireless communications device to activate an inbound communications filter having filter criteria based on a current location of the user and a current location of a sender of an inbound communication. In other words, at step 10, the user of the wireless communications device enables the device to filter incoming communications based on geographical proximity. The device can be manually enabled, i.e. when the user travels to another city or place, or it can be automatically enabled (by having the device autonomously recognize that it has roamed to another city and then automatically activate a geographical-based filter or profile based on preferences or settings, which would be preset by the user). Optionally, the user may modify, change, alter or override the roaming profile that has been set (or any of the filter characteristics that are currently being used) to suit changing needs or wishes. Activating the inbound communications filter (or enabling the roaming profile) can be done prior to roaming or after the device has started roaming (or even while the device is "in transit", e.g. on an airplane with the wireless transceiver shut off).

After the user has activated the inbound communications filter (or roaming profile or geographically based filter) to thus explicitly or implicitly define the filter criteria, the device then determines, upon receipt of each new inbound communication (step 12), whether the inbound communication satisfies the filter criteria (step 14) by comparing the location of the sender of the inbound communication with the current location of the user of the device.

If the inbound communication satisfies the filter criteria, the device then notifies the user that the inbound communication has been received, as will be elaborated below with respect to steps 18-28. If the inbound communication does not satisfy the filter criteria, i.e. the inbound communication has not originated within a desired proximity of the user, then the device notifies the user of the inbound communication (step 16) in a normal manner (i.e. using a normal ring tone for incoming calls and displaying e-mails or other text messages in the normal manner, e.g. by placing them in the usual inbox with the usual font and color).

Provided that the inbound communication satisfies the filter criteria, the device determines (step 17) the type of incoming communication (i.e. whether the communication is a telephone call (voice data) or whether it is text data, such as an e-mail, SMS, MMS, or PIN message).

If the inbound communication is an e-mail (step 18), and provided, of course, that the e-mail satisfies the filter criteria as being sufficiently proximate or local to the roaming user, the device then displays the inbound e-mail in a manner that exclusively displays, highlights, prioritizes or gives precedence to this "local" inbound e-mail over other ("non-local") inbound e-mails. Similarly, if the inbound communication is a telephone call (step 20), and provided, of Course, that the telephone call satisfies the filter criteria as being sufficiently local to the roaming user, the device will notify the user of the incoming call in a manner that gives precedence to, or otherwise distinguishes, this local incoming call over other (non-local) calls.

For example, at step 22, the device may be configured to display all inbound e-mail messages that satisfy the filter criteria without displaying inbound e-mail messages that fail to satisfy the filter criteria. This exclusive displaying of local messages (i.e. to the exclusion of non-local messages) can be accomplished, for example, by having a dedicated (i.e. separate) inbox for local inbound e-mails which is shown as the default inbox when the user accesses his e-mail application or which is, at least, shown more prominently than the main inbox containing all e-mails regardless of their point of origin. In this example implementation, the user can then switch from the (default) local inbox to the main inbox to view other e-mails, as desired.

As an alternative to having a separate inbox dedicated to local e-mails (step 22) that exclude non-local e-mails, the device can also be configured to display all received e-mails in the same inbox (i.e. the usual main inbox), but display the local messages in a visually distinctive manner that distinguishes inbound e-mail messages satisfying the filter criteria from messages that do not satisfy the filter criteria. For example, at step 24, the device can be configured to display all received e-mails in the same inbox but to show those that have originated locally to the roaming device using a distinctive font and/or a distinctive color. Alternatively, the e-mails that have originated locally can have an icon beside them. Furthermore, a distinctive beep or other auditory signal could be sounded to signal that the incoming e-mail has originated from a sender who is local to the roaming device.

For incoming voice calls (step 20), the device can be configured to sound a distinctive ring tone for an inbound telephone call satisfying the filter criteria (step 26). Alternatively, the device can be configured to sound a ring tone at an increased volume for an inbound telephone call satisfying the filter criteria (step 28). Of course, as a further alternative, the device can be configured to sound a distinctive ring tone at an increased volume (combining steps 26 and 289). As will be appreciated, there are numerous ways of notifying the user of the local incoming communication so as to distinguish communications that originate locally from those originate remotely. FIG. 1 merely depicts, by way of example only, two different ways of distinctively notifying the user for both voice and text, although other techniques could be used to signal that a local communication is incoming. For example, the wireless device could be configured to simultaneously vibrate (and/or play a distinct sound and/or use synthesized speech to announce that a local call is incoming, etc.) to signal to the user that the incoming communication has originated locally and is thus of higher priority than other (non-local) communications.

In a further example, non-local e-mails might, be received silently (with the mail envelope icon appearing or blinking), but if the e-mail is from a contact or IP address that is local to the roaming device, the device could beep, play a sound, alarm or ring tone, vibrate, or cause a special icon to appear or blink, or cause the UI to change to a different theme. These various techniques are merely presented by way of further examples to illustrate that the user can be notified of a locally originated communication in a distinctive manner that the user will recognize as being associated with a local communication.

In one implementation, the filter criteria can be defined by enabling the user to specify a distance between the user of the device and the sender of the inbound communication within which the user is to be notified of inbound communications from the sender. For example, the user could specify that he or she is to be notified of any incoming communication that originates from a sender who is within a radius of 100 km of the user's current location.

The distance between the current location of the user and the location of the sender can be determined in a number of different ways. For example, the mobile user's current location can be determined fairly precisely using GPS (provided the device has a GPS chipset or is connected to an external GPS puck, such as via a Bluetooth™ connection). Alternatively, the mobile user's current location can be determined by estimating a distance to cellular base stations using triangulation of signals from in-range base stations, such as used for Wireless E911. Techniques for locating a wireless device using radiolocation include (i) angle of arrival (AOA) which entails locating the caller at the point where signals from two towers intersect; (ii) time difference of arrival (TDOA), which uses multilateration like GPS, except that the networks determine the time difference and therefore the distance from each tower; and (iii) location signature, which uses "fingerprinting" to store and recall patterns (such as multipath) which mobile phone signals exhibit at different locations in each cell. Depending on the circumstances, and in particular the density of cell towers in a given area, it may also be possible to simply use the closest cell tower (with triangulation) as a sufficient approximation for the location of the user. Since cell towers are often more densely located in highly populated areas, they would accordingly provide better resolution where it is generally most required.

The sender's location can be determined by looking up the sender in the user's address book of contacts and correlating the particular e-mail address or telephone number with a particular work address or home address. For communications emanating from a mobile device, i.e. for an incoming e-mail or incoming telephone call originating from a mobile device, the mobile device itself may send its current location or GPS coordinates as part of the call signalling and setup.

If the sender's contact information is not stored in the user's address book, then the location of the sender can be determined from the area code of the incoming telephone call or from the IP address of the incoming e-mail.

In another implementation, the user can define the filter criteria by selecting a predefined geographical area (e.g. city, state, country, time-zone, continent, etc.) so that the user is notified of any inbound communications originating from within the predefined geographical area. The user can select a generic geographical area (the granularity of the filter) so that the device automatically switches to the city or country in which it is roaming without having to specify which city or which country. This requires the device to correlate its GPS coordinates with a database of ranges of latitude and longitude coordinates for cities, counties, states, provinces, countries, etc. Alternatively, as another example, the user can select a specific city from a menu of cities, thereby defining specifically the filter criteria so that any call or e-mail originating from within that particular city is highlighted or given precedence. Optionally, the user can specify whether the filter is to apply to any incoming communication or only those from recognized contacts about whom information is stored in the user's address book. In other words, the user can activate a roaming profile that prioritizes inbound communications from contacts whose addresses are within a specified geographical area, presenting these in a distinctive manner to distinguish these over all other incoming communications.

Figure 2:
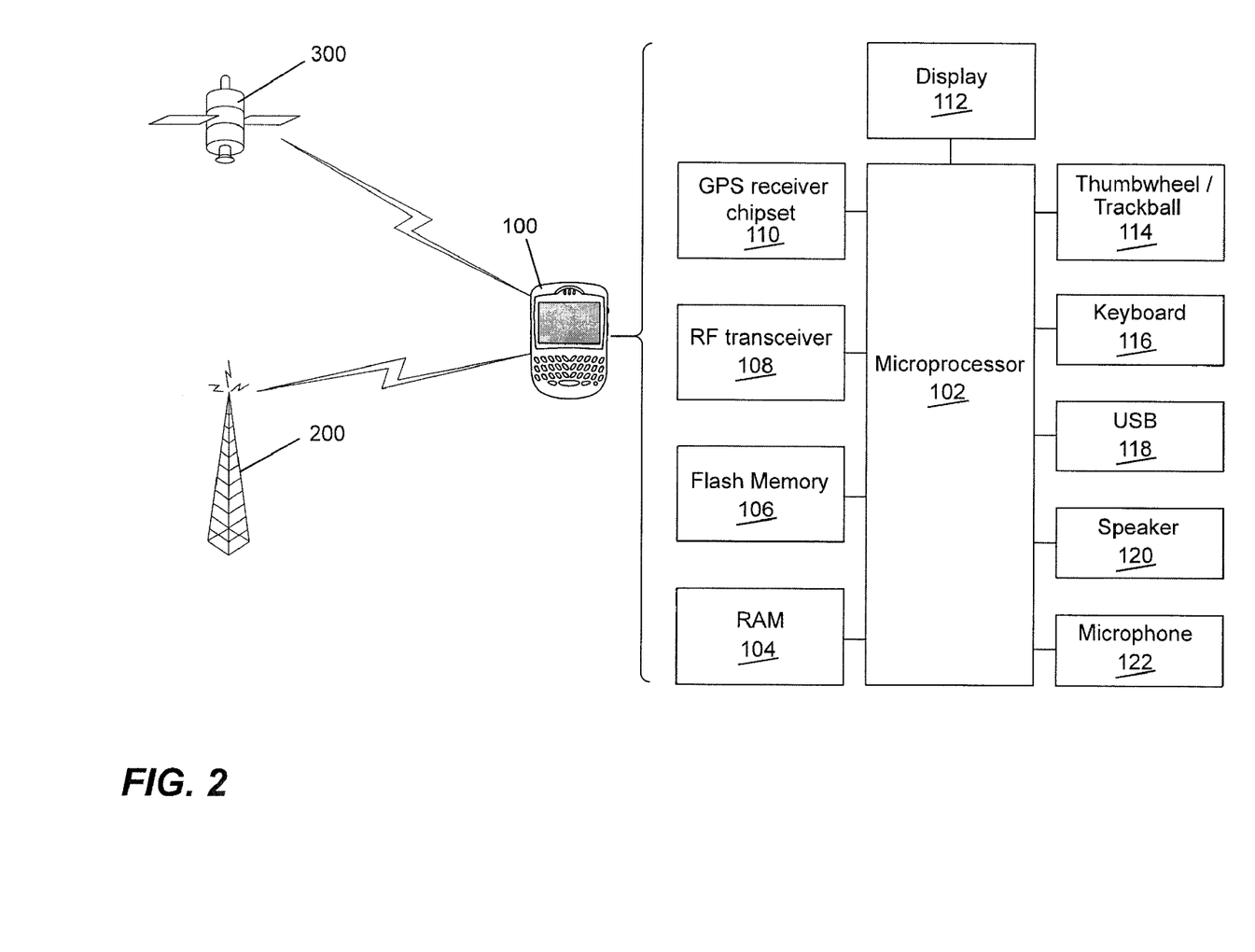
FIG. 2 is a block diagram of key components of a wireless communications device on which the present technology can be implemented.

FIG. 2 is a block diagram depicting certain key components of a wireless communications device 100 on which the present technology can be implemented. It should be expressly understood that this figure is intentionally simplified to show only certain components; the device 100 of course includes other components beyond those shown in FIG. 2. The device 100 includes a microprocessor 102 (or simply a "processor") which interacts with memory in the form of RAM 104 and flash memory 106, as is well known in the art. The device 100 includes an RF (radio-frequency) transceiver 108 for communicating wirelessly with one or more base stations 200. The device 100 includes a GPS (Global Positioning System) receiver chipset 110 for receiving GPS radio signals transmitted from one or more orbiting GPS satellites 300. In terms of input/output devices or user interfaces (UI), the device 100 typically includes a display 112 (e.g. a small LCD screen), a thumbwheel and/or trackball 114, a keyboard or keypad 116, a USB 118 or serial port for connecting to peripheral equipment, a speaker 120 and a microphone 122. The processor and memory thus enable an e-mail application to run on the wireless device for receiving and sending e-mails. Similarly, the processor and memory can enable other text messaging such as SMS, MMS or PIN messages. The speaker 120, microphone 122 and RF transceiver circuitry 108 form part of a voice communication subsystem that enables cellular communication.

Depending on the mobile user's subscription and network compatibilities, the wireless communications device 100 can usually roam to another location away from its home area, such as to another city. After being turned on in another city or after a handover to the host network, the host network will recognize that the wireless device is unregistered, and will then attempt to identify its home network typically by using the IMSI number. If there is an agreement between the networks permitting roaming, the host network will maintain a temporary subscriber record (e.g. a Visiting Location Register, or VLR) for the roaming wireless device while the home network updates its own information in its Home Location Register (HLR) to indicate that the device is roaming on a host network. In detecting that the device is roaming, the device can then, depending on its settings, either (i) prompt the user to manually activate the roaming profile (or otherwise prompt the user to manually set filter criteria based on geographically based parameters) or (ii) automatically activate the roaming profile. The automatically activated roaming profile can include preset filter criteria preconfigured during the device set-up, or preconfigured by the system administrator, etc. As noted above, the filter criteria (in either manual or automatic activation scenarios) can be defined in terms of a particular city, county, state or province, country, continent, etc. or in terms of a particular distance from the user (e.g. any messages from within a 100-kilometer radius of the current location of the user).

Figure 3:
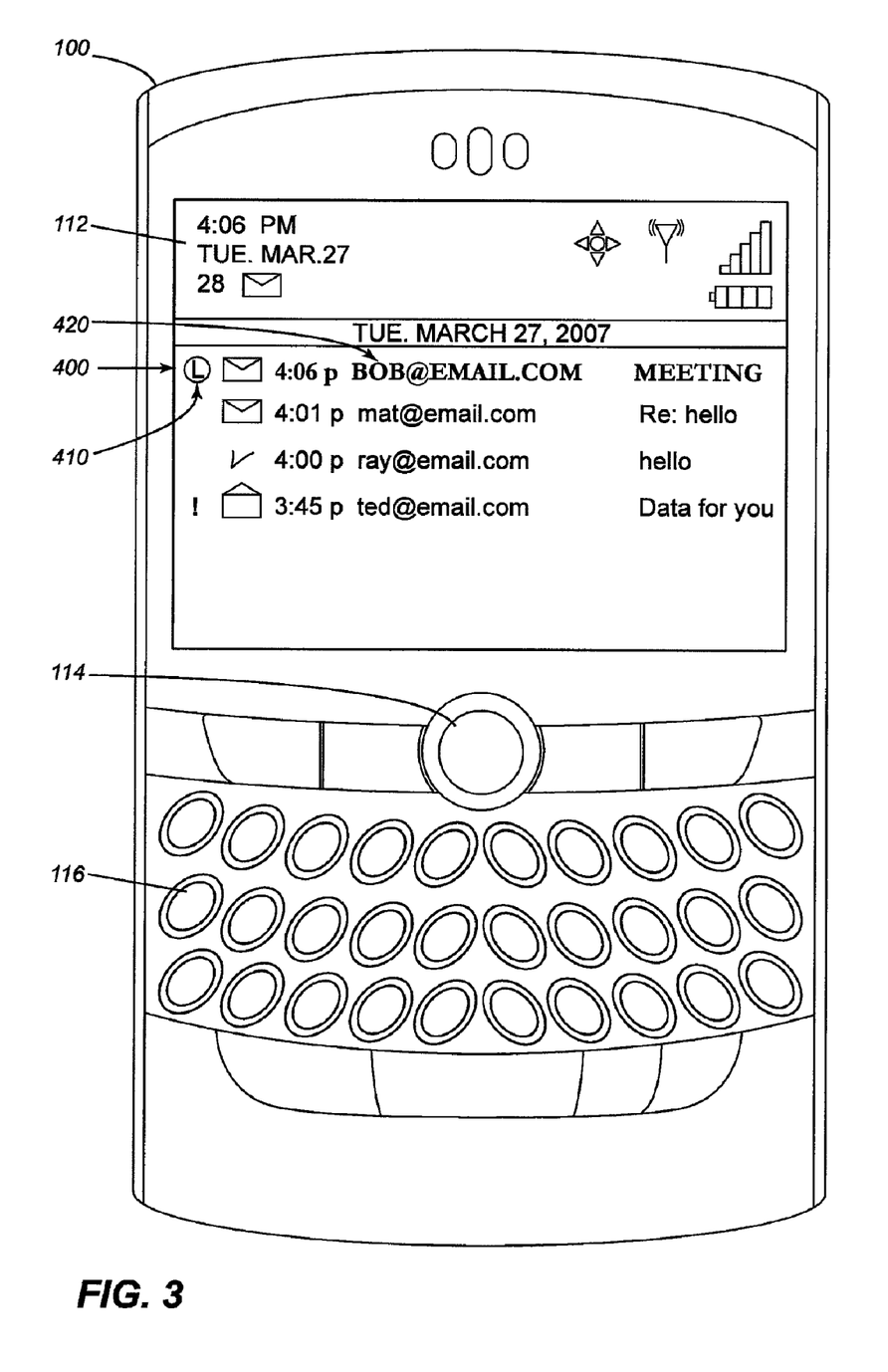
FIG. 3 is a depiction of a wireless communications device displaying an inbox in which e-mails that have originated locally to the device are presented with a distinctive font to distinguish these locally originated e-mails from those that have not originated locally.

FIG. 3 depicts, by way of example only, a wireless communications device 100 having a display 112 for displaying inbound e-mails or other text-based communications, and a trackball 114 and alphanumeric (QWERTY-style) keypad 116 for opening, replying to, forwarding, deleting, and sending e-mails, as well as selecting or accessing other functions of the device, as is known in the art. As depicted in the example presented in FIG. 3, the display 112 can display an inbox 400 in which any e-mail that has originated locally to the device is presented with a distinctive font to distinguish each of these locally originated e-mails (or other text messages) from those e-mails (or other text messages) that have not originated locally. For example, as shown in FIG. 3, the inbox contains four e-mails: a first e-mail 420 from bob@email.com that is presented in uppercase (capital) letters and/or in a distinctive font and/or in a distinctive color because it has originated locally to the user, thus satisfying the filter criteria for special (priority) treatment. In contradistinction, the second e-mail from mat@email.com is presented in lower-case letters in the usual font and color because this e-mail has not originated locally and is thus displayed in a normal manner. Likewise, the third e-mail (an outbound e-mail to ray@email.com) is presented normally (in lower-case letters without special fonts or colors). The fourth e-mail (a received and read e-mail from ted@email.com) is displayed normally. Optionally, in addition to, or in lieu of the special distinctive font and/or color and/or lettering size used to distinguish local incoming communications, the device may display a small icon 410, such an L with a circle around it, to indicate that the e-mail has originated locally to the user. As mentioned above, the device may also use an audible alert (play a special sound, ring tone, beep, etc.) or vibrate to signify that the incoming e-mail is local.

Figure 4:
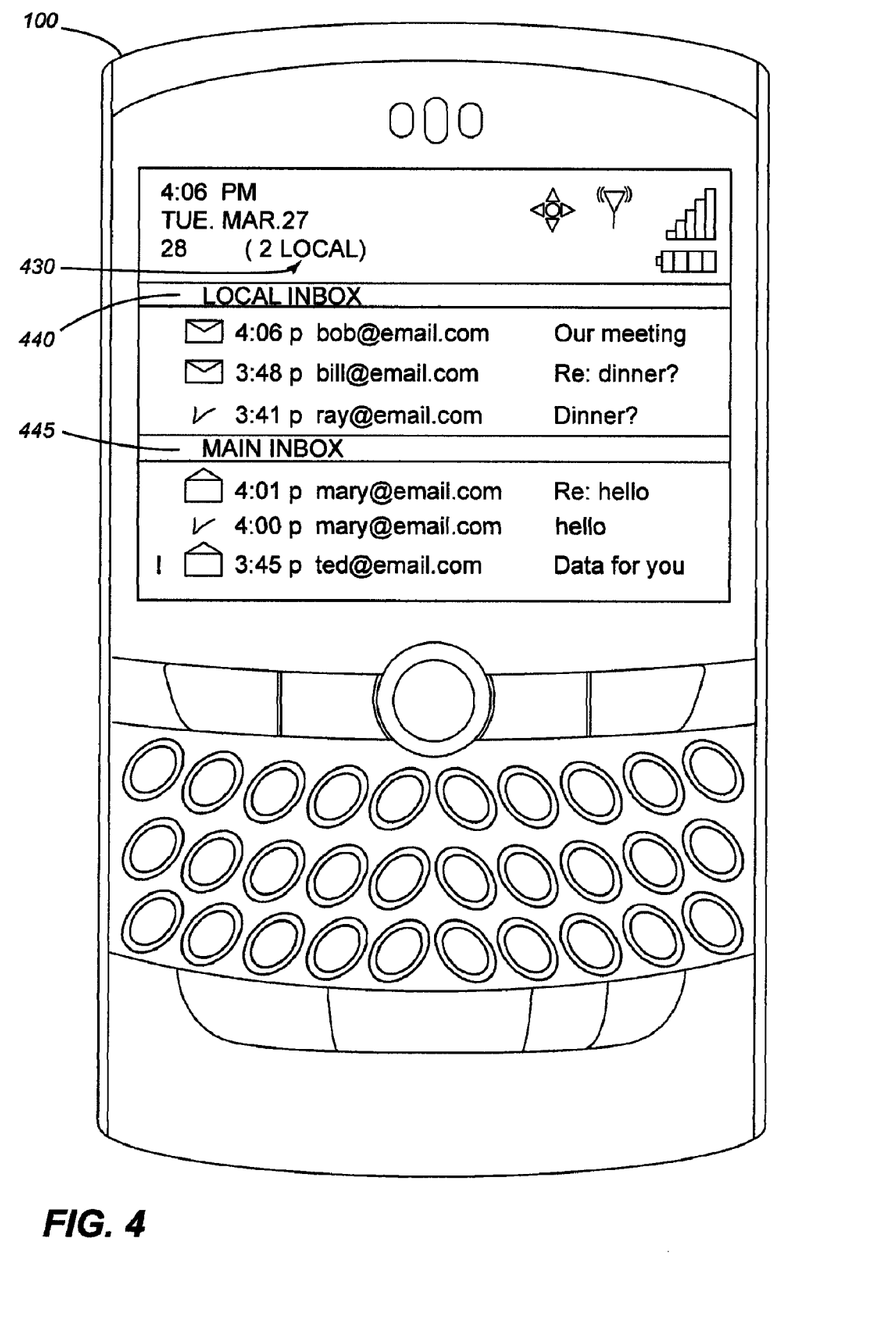
FIG. 4 is a depiction of a wireless communications device displaying a local inbox for presenting e-mails that have originated locally to the device and a separate main inbox for presenting all other e-mails that have not originated locally.

FIG. 4 depicts, again by way of example only, a wireless communications device 100 that displays a local inbox 440 for presenting e-mails that have originated locally to the device and a separate main inbox 445 for presenting all other e-mails that have not originated locally. As a further optional feature, the device 100 can display a numerical indication 430 of the number of local e-mails. For example, as depicted in FIG. 4, the number of local e-mails can be presented in parentheses in a top portion of the display beside the total number of e-mails that are currently waiting to be read in the inbox (or inboxes, in the case of a "split" inbox). In this particular example depicted in FIG. 4, the display shows the envelope icon and the number 28 to indicate that there are 28 unread e-mails in the user's inbox (or inboxes) of which 2 are local, namely the unread e-mails from bob@email.com and from bill@email.com.

Figure 5:
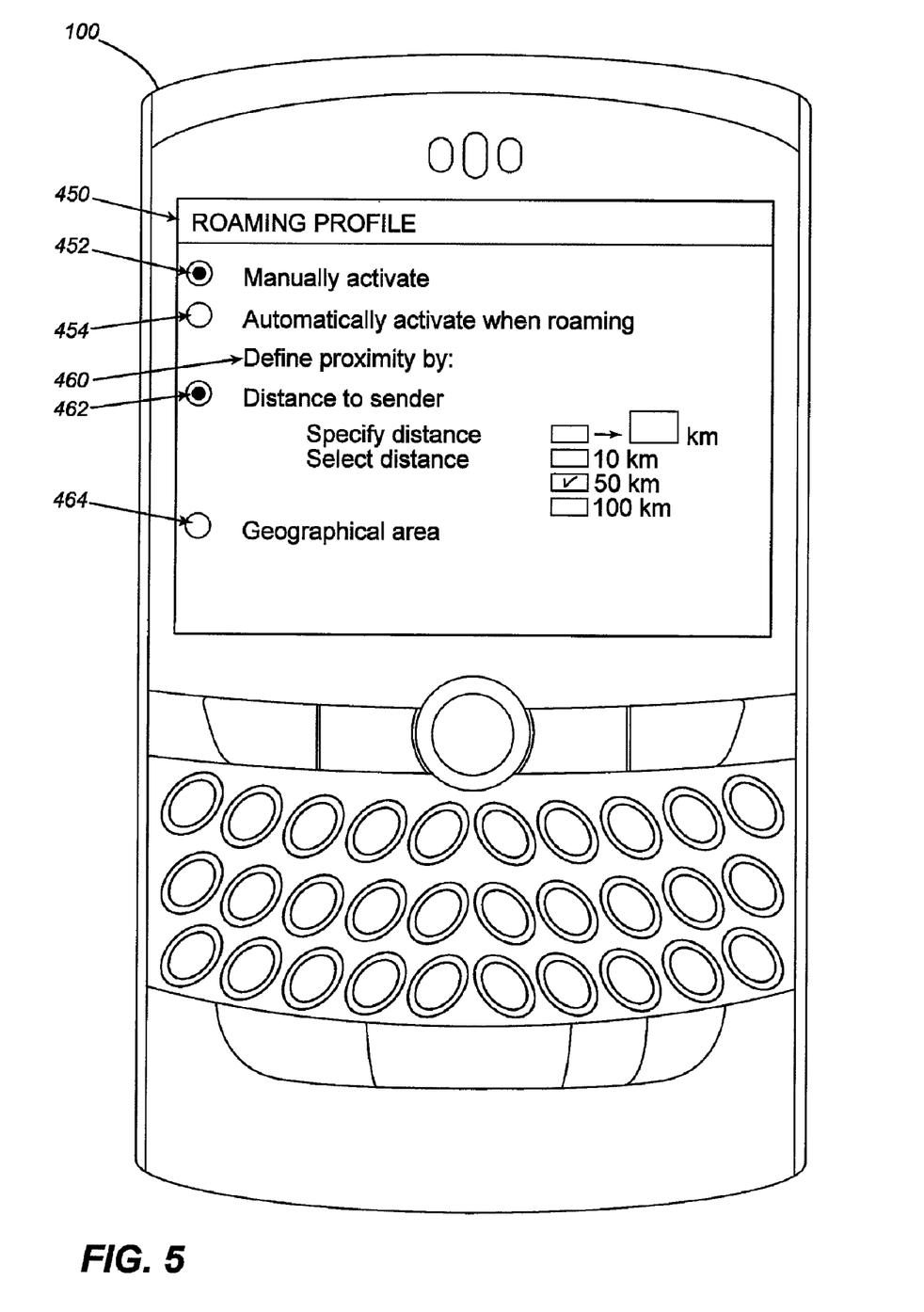
FIG. 5 is a depiction of a wireless communications device displaying an example of a user-configurable roaming profile that has been manually activated to give precedence to inbound communications received from senders that are within, for example, 50 km of the user's current position.

FIG. 5 depicts a wireless communications device 100 displaying an example of a user-configurable roaming profile 450 that has been manually activated to give precedence to inbound communications received from senders that are within, for example, 50 km of the user's current position. As depicted in the example presented in FIG. 5, the roaming profile 450 includes a toggle or button 452 to enable the user to manually activate the roaming profile as well as a corresponding toggle 454 for alternatively enabling the user to activate the roaming profile automatically upon roaming. In this particular example, the manual activation is toggled. In addition, as depicted in the example presented in FIG. 5, the roaming profile 450 may include a user-configurable proximity definition 460 to enable the user to define what constitutes a "local" communication. Specifying this proximity threshold thus defines the filter criteria by which the device decides whether to treat an incoming communication as local or not. In this example, the user can either define the filter criteria in terms of a distance to the sender 462 or in terms of a geographical area 464. In this particular example, the "Distance to sender" option has been toggled, thus causing the device to further display two further options, namely a first option enabling the user to specify a distance (e.g. in kilometres) by typing a numerical value into a field or box. If the "Distance to sender" option has been toggled, a second option enables the user to tick off one of a plurality of predetermined distances, such as, for example, 10 km, 50 km, or 100 km. The roaming profile could include settings to enable the user to switch the units from kilometres to miles. Alternatively, the roaming profile could automatically switch between kilometres and miles when the device roams from a jurisdiction that uses the metric system (e.g. Canada) to a jurisdiction that uses miles (e.g. the U.S.) and vice versa.

Figure 6:
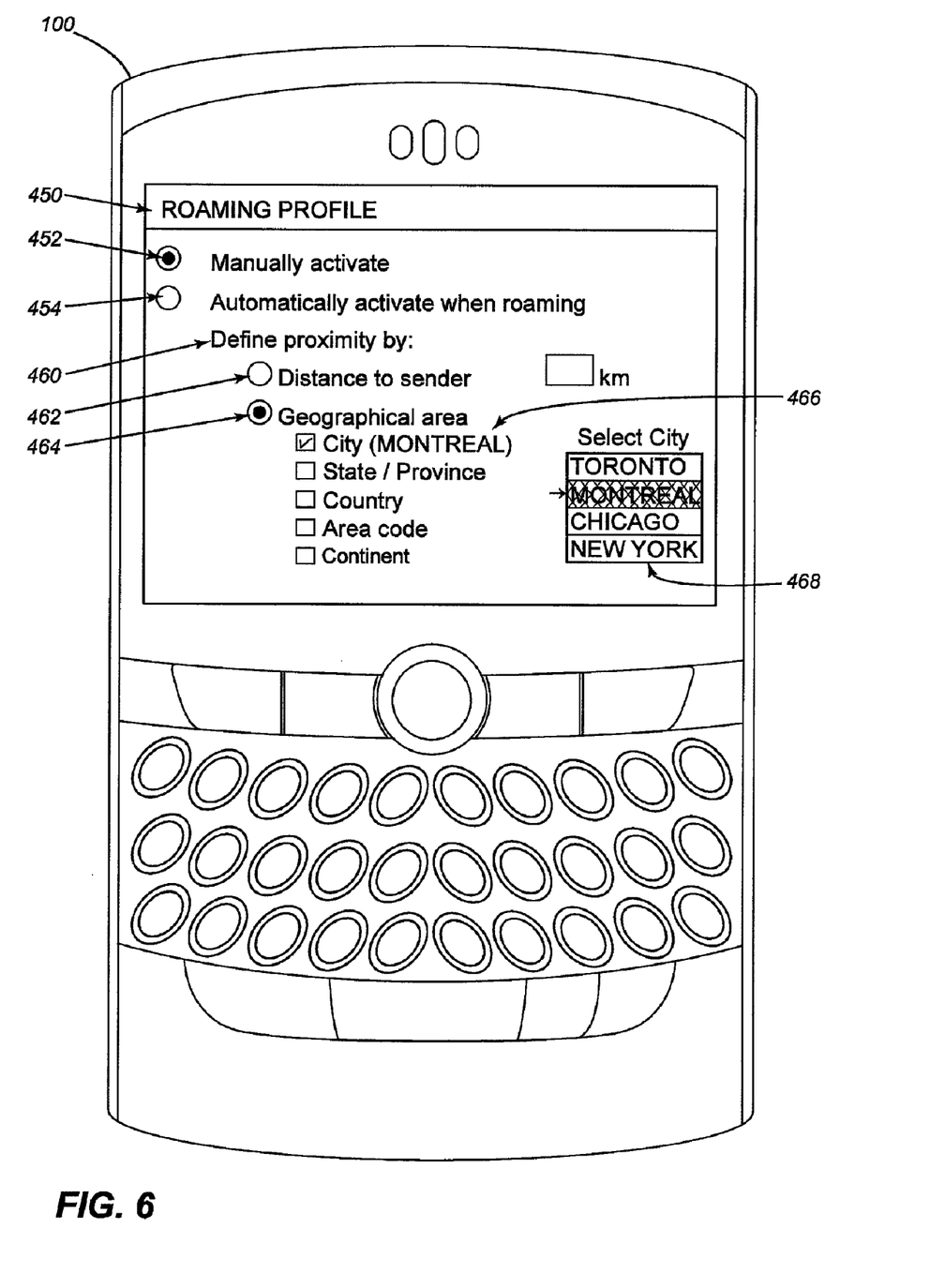
FIG. 6 is a depiction of a wireless communications device displaying an example of a user-configurable roaming profile that has been manually activated to give precedence to inbound communications received from senders that are within the city of Montreal.

FIG. 6 depicts a wireless communications device 100 displaying the user-configurable roaming profile 450 introduced in FIG. 5. The roaming profile 450 has been manually activated (452) to give precedence to inbound communications received from senders that are within a specified city (e.g. the city of Montreal). In the example presented in FIG. 6, the "Geographical area" toggle 464 has been selected and the box corresponding to "City" 466 has been checked. In this particular example, the device enables the user to select a city from a menu 468 or list of cities. In this example, the user has selected Montreal from the list. Optionally, an arrow (or other indicator) can be used to point to the selected city (Montreal) and/or optionally the choice (Montreal) can be shaded grey. As a further option, the "City" box 466 can be updated to show the selected city (Montreal) in parentheses, as illustrated in FIG. 6.

Figure 7:
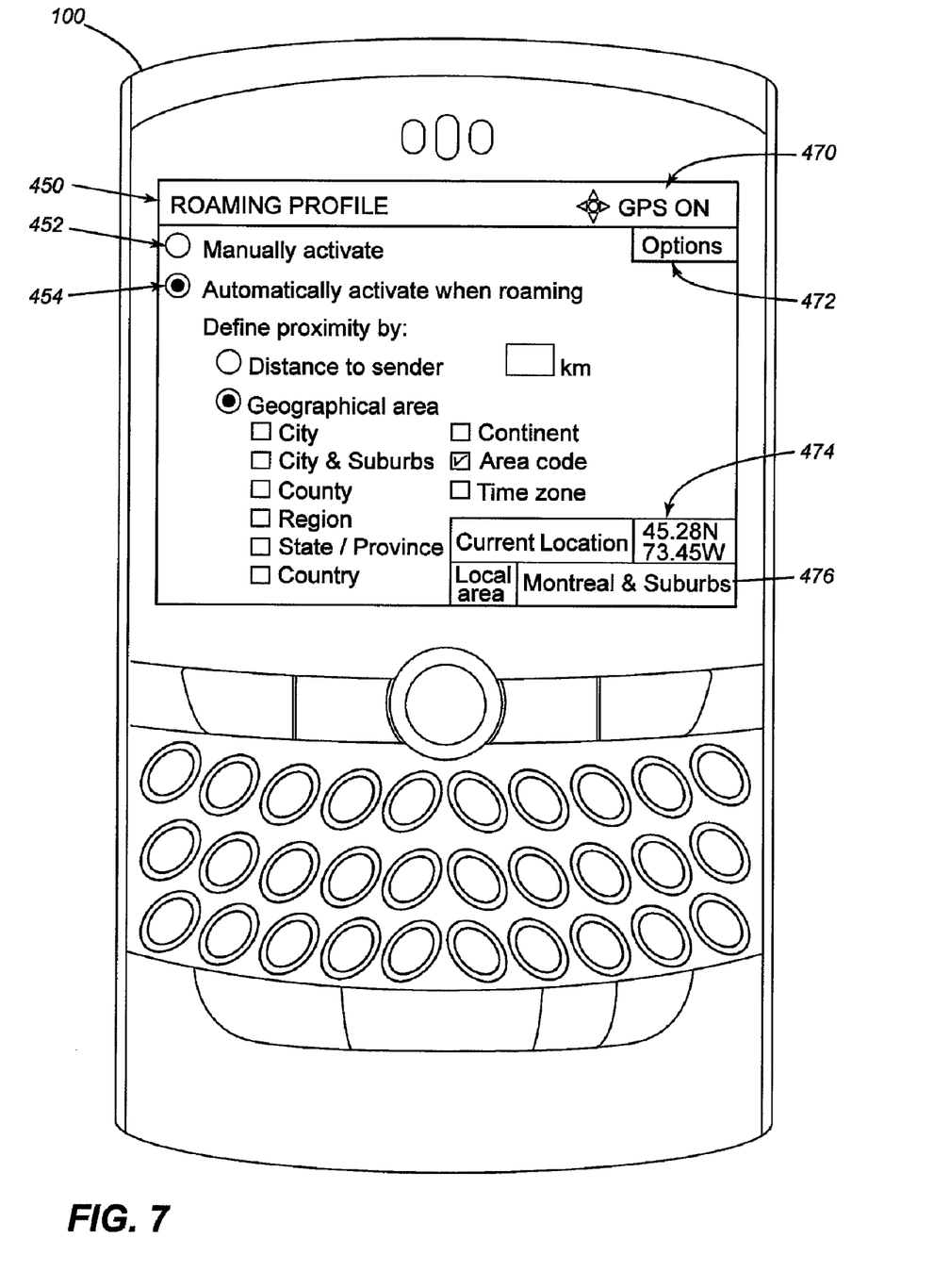
FIG. 7 is a depiction of a wireless communications device displaying an example of a user-configurable roaming profile that is set for automatic activation when the device roams to a specified geographical area ("Montreal and suburbs") so as to give precedence to inbound communications received from senders that are within the city of Montreal or its suburbs.

FIG. 7 depicts a wireless communications device 100 displaying the user-configurable roaming profile 450 introduced in FIG. 5 but now configured for "auto" mode. In this further example, the roaming profile 450 has been set or configured for automatic activation (i.e. toggle 454 has been selected instead of toggle 452) so that when the device roams to another location that is distant from its home area the device automatically switches to the roaming profile 450. In this particular example, the filter criteria are being defined in terms of a geographical area (specifically, in this example, in terms of a city and its suburbs). As depicted in this figure, the box "City & Suburbs" has been checked by way of example only, but the roaming profile could provide a number of possible geographical areas to choose from, as shown in this example: city, city and suburbs, county, region, state/province, country, continent, area code, time zone, etc.

Since automatic activation has been selected in this example (i.e. the toggle/button 454 has been clicked), the device automatically detects that it is roaming, determines its current position (using GPS and/or base station radiolocation techniques) and then correlates the current location with the particular geographical area selected by the user. In this particular example presented in FIG. 7, the device may display that the GPS is on ("GPS ON" 470 or use an icon for GPS or other location-determining capability). The device may also present an "Options" button 472 to set further features or activate advanced options, which will be described below with reference to FIG. 8.

Optionally, as shown in the example presented in FIG. 7, the device can display the current location 474 in terms of latitude and longitude and the name of the geographical area 476 corresponding to this current location. Display of these pieces of information can also be suppressed by the user if the user desires to de-clutter the user interface (UI). In this particular example, the GPS-determined current location is 45.28 N and 73.45 W. By correlating this current location to a look-up table of latitude and longitude ranges or boundaries for cities and their suburbs (the selected geographical area in this example), the device determines that the current location is within the city of Montreal and its suburbs.

If the coordinates fall outside any known city and its suburbs (the category of geographical area specified) the device can periodically or intermittently provide a warning to the user that the roaming profile has not yet been automatically activated, e.g. after a long time has elapsed, or if the user has remained in the same area for a long time, suggesting that the user has reached his destination and that the destination does not correspond to the type of geographical area specified by the user in the roaming profile. In this case, the device can optionally prompt the user to switch to a larger geographical area (i.e. from city and suburbs to county, state/province, country, continent). Alternatively, the device can prompt the user to put the roaming profile into standby mode so that the roaming profile continues to remain inactive until the user roams into the boundaries defining a city (and/or its suburbs). Yet alternatively, the device can prompt the user to put the roaming profile into manual mode or to specifically define the geographical area (i.e. pick a city from a menu of nearby cities) rather than have the device determine the geographical area from its current position, which acts as a sort of "manual override" for situations where a GPS fix is difficult to acquire (e.g. inside a building, underground, etc.) or where the user is roaming on the outskirts of a city's suburban boundary.

Once the roaming profile is automatically activated (i.e. the geographically-based filtering is triggered or initiated by the device roaming into a selected geographical area (e.g. "Montreal and suburbs"), inbound communications that originate from within the specified geographical area (e.g. Montreal and its suburbs) will be given precedence, highlighted or even possibly displayed to the exclusion of non-local incoming communications. For automatic activation, the user can define filter criteria either generically by selecting a generic geographical area (city, state, country) or specifically by selecting a specific geographical area (specific city, specific state, specific country). In the former case, the device activates the roaming profile automatically when it roams to any city (or any state or any country) provided the current position falls within the bounds of any one of the cities (or states or countries) in its database. In the latter case, the device automatically activates the roaming profile when the device roams to the specifically identified city (e.g. Montreal, Toronto, New York) that the user has selected.

Figure 8:
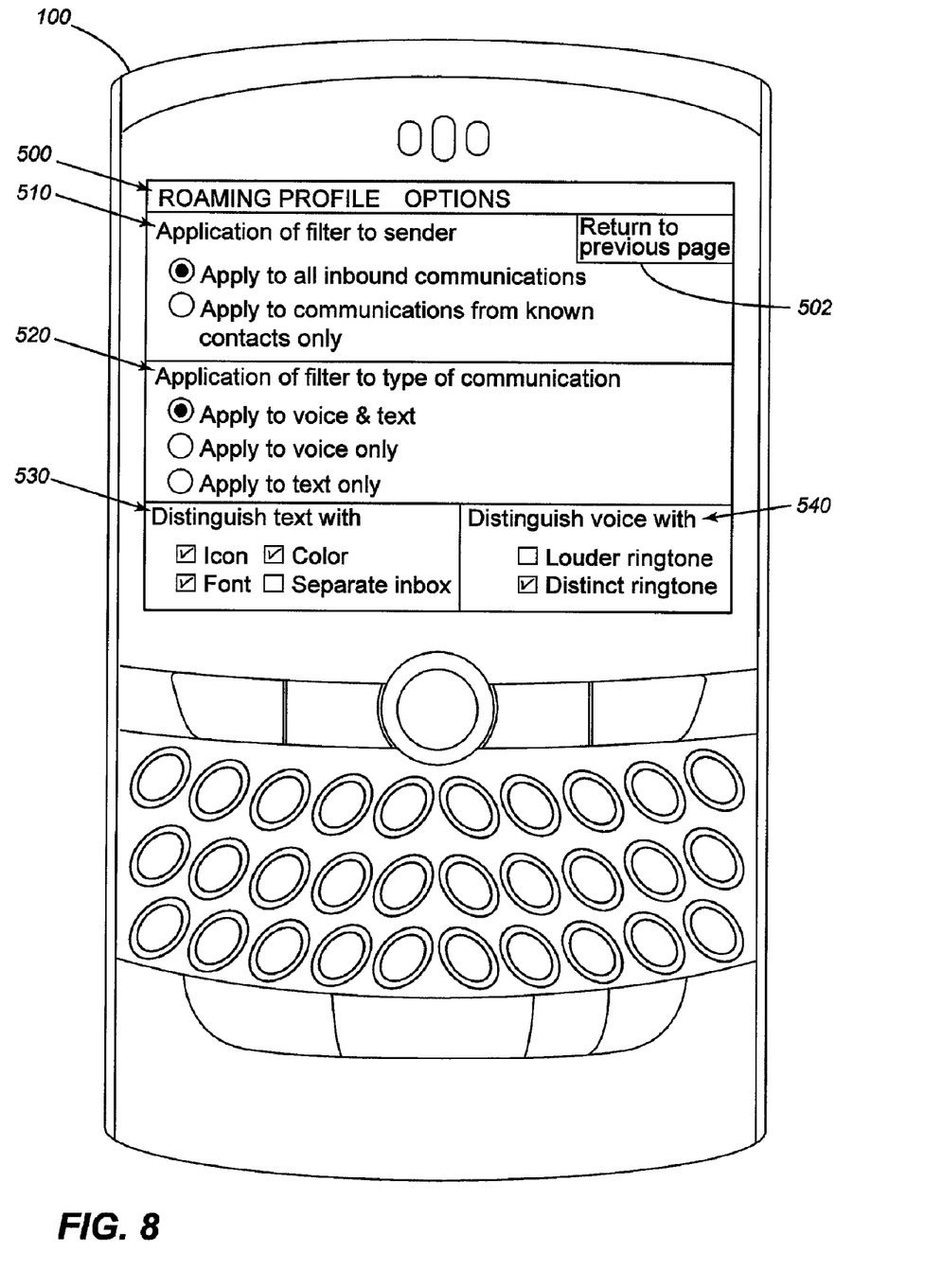
FIG. 8 is a depiction of a wireless communications device displaying an example of a roaming profile options page that can be configured by the user to define the application of the filter to senders and to different types of communication, how to distinguish incoming text communications and how to distinguish incoming voice communications.

FIG. 8 depicts a wireless communications device displaying an example of a roaming profile options page 500 that can be configured by the user to define how the filter criteria are to be applied to senders and to different types of communication, how to distinguish incoming text communications and how to distinguish incoming voice communications. As depicted in the example presented in FIG. 8, the roaming profile options page 500 may include a first filter setting for filtering based on the identity of the sender ("Application of filter to sender") 510 and a second filter setting for filtering based on the type of communication ("Application of filter to type of communication") 520. As shown in this particular example, the first filter setting 510 enables the user to activate the roaming profile so that it filters all inbound communications or to only those inbound communications that originate from known contacts (i.e. e-mail addresses or phone numbers that are stored in the user's address book). As also shown in this particular example, the second filter setting 520 enables the user to activate the roaming profile's filter so that it applies to both voice and text, to voice only, or to text only. Thus, the user can configure the device so that only local telephone calls are treated specially (but not local e-mails) or vice versa. Usually, though, the user will choose to apply the roaming profile to both voice and text.

As further depicted in FIG. 8, the roaming profile options page 500 may include a text setting 530 and a voice setting 540 to specify how the user wishes to be notified of locally originated incoming communications. For example, as shown in FIG. 8, the text setting 530 may include check boxes to enable distinguishing features such as an icon, a distinctive color, a distinctive font or the use of a separate inbox dedicated to local communications. As shown in this example, the user may select more than one distinguishing feature. In this example, the user has selected "icon", "color" and "text" in the text settings 530 so that any incoming text-based communication that satisfies the filter criteria is presented not only in a different (i.e. distinctive) color and font (such as the first message 420 in FIG. 3) but also with a special icon (such an icon 410 in FIG. 3) beside the communication to indicate that the message has originated locally to the user's device, i.e. with sufficient proximity to the user's device. As also shown in the particular example presented in FIG. 8, the user has configured the voice settings 540 so that inbound telephone calls that satisfy the filter criteria for sufficient geographical proximity trigger a distinctive ring tone.

As illustrated by way of examples in the figures presented above, the user can thus customize the geographical-based profile (or "roaming profile") to screen or filter inbound communications based on location, i.e. by specifying a target geographical entity from which communications are to be given precedence. The target geographical entity that is selected to define the filter criteria can a city, county, state or province, region, country, or continent. Alternatively, the user can define the target geographical entity in terms of other geographically-related indicia such as area code, IP address prefix, postal code or zip code, street, neighbourhood (district, borough, sector, etc.) or in terms of a radius or distance from a particular position specified in terms of latitude and longitude. Correlating a particular position (e.g. GPS coordinates) to a geographical entity (e.g. a city, a state, etc.) can be done using a look-up table or database, or by exploiting the map data accessible by a mapping application that is executing on the device. On a wireless communications device, the processor and memory cooperate to enable a user to run a mapping application that can render map data (which is usually downloaded over the air from a map server). The map data contains polygons that define the boundaries of various geographical features such as cities or municipalities. The device can translate a location to a city/municipality (or, by analogy, other geographical entity) by either using the map data on the device, querying the map data, or asking a server (e.g. the map server or a location-based services (LBS) server) to resolve its location.

Matching up, for example, latitude and longitude to a phone number area code can be done using a database that maps area codes to their geographic area, similar to what can be done with cities/municipalities. For example, one implementation would use a map layer that includes area codes in order to correlate the current location to an area code. In one implementation, all of the map data for the entire world is divided and stored as a grid according to various levels of resolution (zoom). For example, a single A-level "Maplet" represents a 0.05×0.05 degree grid area; a single B-level Maplet represents a 0.5×0.5 degree grid area; a single C-level Maplet represents a 5×5 degree grid area; a single D-level Maplet represents a 50×50 degree grid area; and a single E level Maplet represents the entire world in a single Maplet. A Maplet data structure can be provided that contains all of the graphic and labelled content associated with a geographic area (e.g. map features such as restaurants (point features), streets (line features) or lakes (polygon features)). These Maplets can be structured in Layers of Data Entries ("DEntries") identified by a "Layer ID" to enable data from different sources to be deployed to the device and meshed for proper rendering. Each DEntry is representative of one or more artefact or label (or a combination of both) and includes coordinate information (also referred to as a "bounding box" or "bounding area") to identify the area covered by the DEntry and a plurality of data points that together represent the artefact, feature or label. For example, a DEntry may be used to represent a street on a city map (or a plurality of streets), wherein the carious points within the DEntry are separated into different parts representing various portions of the artefact or map feature (e.g. portions of the street) A wireless device may issue a request for the map server to download only those DEntries that are included within a specified area or bounding box representing an area of interest that can be represented by, for example, a pair of bottom left, top right coordinates. Thus, in each map layer, geographical information can be provided, such as area codes, postal codes, or the identity of the region, county, city, etc. Thus, the device's mapping application could be used to correlate a current location with a particular area code (stored in the map layer), particular postal code, etc.

The foregoing method steps can be implemented as coded instructions in a computer program product. In other words, the computer program product is a computer-readable medium upon which software code is recorded to perform the foregoing steps when the computer program product is loaded into memory and executed on the microprocessor of the wireless communications device.

This new technology has been described in terms of specific implementations and configurations which are intended to be exemplary only. The scope of the exclusive right sought by the Applicant is therefore intended to be limited solely by the appended claims.

The invention claimed is:

1. A method of managing inbound communications received by a roaming wireless communications device, the method comprising:
enabling activation on the roaming wireless communications device of an inbound communications filter having filter criteria based on a current location of the wireless communications device and a current location of a sender of an inbound communication;
determining whether the inbound communication comprising text data satisfies the filter criteria; and
displaying a notification that the inbound communication satisfying the filter criteria has been received, the notification being listed in an inbox so as to visually distinguish the inbound communication that satisfies the filter criteria from other inbound communications.

2. The method as claimed in claim 1 wherein displaying the notification comprises displaying all inbound e-mail or text messages that satisfy the filter criteria without displaying inbound e-mail or text messages that fail to satisfy the filter criteria.

3. A computer readable medium comprising code adapted to perform the method of claim 2 when the computer readable medium is loaded into memory and executed on a processor of a wireless communications device.

4. The method as claimed in claim 1 wherein displaying the notification comprises displaying an inbound e-mail or text message in a visually distinctive manner that distinguishes inbound e-mail or text messages satisfying the filter criteria from messages that do not satisfy the filter criteria.

5. A computer readable medium comprising code adapted to perform the method of claim 4 when the computer readable medium is loaded into memory and executed on a processor of a wireless communications device.

6. The method as claimed in claim 1 wherein displaying the notification comprises displaying an inbound e-mail or text message using a distinctive color and/or a distinctive font.

7. A computer readable medium comprising code adapted to perform the method of claim 6 when the computer readable medium is loaded into memory and executed on a processor of a wireless communications device.

8. The method as claimed in claim 1 further comprising sounding a distinctive sound for the inbound communication satisfying the filter criteria.

9. A computer readable medium comprising code adapted to perform the method of claim 8 when the computer readable medium is loaded into memory and executed on a processor of a wireless communications device.

10. The method as claimed in claim 1 wherein enabling activation of the inbound communications filter comprises enabling definition of the filter criteria by specifying a distance between the device and the sender of the inbound communication within which the device is to receive notification of inbound communications from the sender.

11. A computer readable medium comprising code adapted to perform the method of claim 10 when the computer readable medium is loaded into memory and executed on a processor of a wireless communications device.

12. The method as claimed in claim 1 wherein enabling activation of the inbound communications filter comprises enabling definition of the filter criteria by selecting a predefined geographical area for notification of any inbound communications originating from within the predefined geographical area.

13. A computer readable medium comprising code adapted to perform the method of claim 12 when the computer readable medium is loaded into memory and executed on a processor of a wireless communications device.

14. The method as claimed in claim 1 wherein enabling activation of the inbound communications filter comprises enabling definition of the filter criteria by selecting a city for notification of any inbound communications originating from within the city.

15. A computer readable medium comprising code adapted to perform the method of claim 14 when the computer readable medium is loaded into memory and executed on a processor of a wireless communications device.

16. The method as claimed in claim 1 wherein enabling activation of the inbound communications filter comprises enabling activation of a roaming profile that prioritizes inbound communications from contacts whose addresses are within a specified geographical area.

17. A computer readable medium comprising code adapted to perform the method of claim 16 when the computer readable medium is loaded into memory and executed on a processor of a wireless communications device.

18. A computer readable medium comprising code adapted to perform the method of claim 1 when the computer readable medium is loaded into memory and executed on a processor of a wireless communications device.

19. The method as claimed in claim 1 wherein displaying the notification comprises displaying notifications for inbound e-mail or text messages that satisfy the filter criteria within a separate local-specific inbox dedicated for local messages that is separate from a main inbox that displays all inbound e-mail or text messages regardless whether the inbound e-mail or text messages satisfy the filter criteria.

20. A wireless communications device comprising:
an input device for activating an inbound communications filter having filter criteria based on a current location of the wireless communications device and a current location of a sender of an inbound communication;
a processor coupled to memory for determining whether the inbound communication comprising text data satisfies the filter criteria; and
a user output interface for displaying a notification that the inbound communication has been received, the notification being listed in an inbox so as to visually distinguish the inbound communication that satisfies the filter criteria from other inbound communications.

21. The wireless communications device as claimed in claim 20 wherein the user output interface is a display screen that displays only inbound e-mail or text messages that satisfy the filter criteria within a separate local-specific inbox dedicated for local messages that is separate from a main inbox that displays all inbound e-mail or text messages regardless whether the inbound e-mail or text messages satisfy the filter criteria.

22. The wireless communications device as claimed in claim 20 wherein the user output interface is a display screen that displays, in a main inbox of an e-mail or text-messaging application running on the device, an inbound e-mail or text message in a visually distinctive manner that distinguishes inbound e-mail or text messages satisfying the filter criteria from messages that fail to satisfy the filter criteria.

23. The wireless communications device as claimed in claim 22 wherein the inbound message is displayed in the main inbox using a distinctive color and/or a distinctive font.

24. The wireless communications device as claimed in claim 20 wherein the user output device further comprises a speaker that sounds a distinctive sound for the inbound communication satisfying the filter criteria.

25. The wireless communications device as claimed in claim 20 wherein the user input device enables a distance between device and the sender of the inbound communication to be specified within which the device is to receive notification of inbound communications from the sender.

26. The wireless communications device as claimed in claim 20 wherein the user input device enables selection of a predefined geographical area so that the user output device can notify of any inbound communications originating from within the predefined geographical area.

27. The wireless communications device as claimed in claim 20 wherein the user input device enables selection of a city so that the user output device can notify of any inbound communications originating from within the city.

28. The wireless communications device as claimed in claim 20 wherein the user input device enables activation of a roaming profile that prioritizes inbound communications from contacts whose addresses are within a specified geographical area.

* * * * *